United States Patent [19]

Andersson et al.

[11] Patent Number: 4,529,841
[45] Date of Patent: Jul. 16, 1985

[54] INTERCEPT INFORMATION DISPLAY FOR A PRIVATE AUTOMATIC BRANCH EXCHANGE TELEPHONE SYSTEM

[76] Inventors: Jan Andersson, Sulitelmavägen 15, 16133 Bromma; Valter Swedberg, Rävnäsvägen 43, 12542 Älvsjö; Benjamin Trok, Nytorgsgahan 24, 11622 Stockholm; Kurt Paulsson, Filipstadsbacken 50, 12343 Farsta, all of Sweden

[21] Appl. No.: 621,896

[22] Filed: Jun. 20, 1984

Related U.S. Application Data

[63] Continuation of Ser. No. 569,655, Jan. 10, 1984, abandoned, which is a continuation of Ser. No. 185,731, Sep. 11, 1980, abandoned.

[30] Foreign Application Priority Data

Sep. 25, 1979 [SE] Sweden ................................ 7907914
Feb. 18, 1980 [SE] Sweden ................................ 8001267

[51] Int. Cl.³ .............................................. H04M 3/54
[52] U.S. Cl. ............................ 179/18 BE; 179/27 FG
[58] Field of Search .......... 179/18 BD, 18 B, 18 BE, 179/27 FH, 27 FG, 27 FF, 27 FC, 84 C, 18 AD

[56] References Cited

U.S. PATENT DOCUMENTS

| Re. 30,903 | 4/1982 | Vicari et al. | 179/27 FH |
|---|---|---|---|
| 3,542,961 | 11/1970 | Klein et al. | 179/18 BE |
| 3,736,382 | 5/1973 | Braun et al. | 179/18 BE |
| 3,859,474 | 1/1975 | Guelnpfennig et al. | 179/27 DA |
| 3,934,098 | 1/1976 | Merritt, Jr. | 179/84 C |
| 4,086,441 | 4/1978 | Ullakko et al. | 179/84 C |
| 4,117,270 | 9/1978 | Lesea | 179/18 BE |
| 4,121,052 | 10/1978 | Richard | 179/2 DP |
| 4,146,929 | 3/1979 | Troughton et al. | 364/900 |
| 4,229,624 | 10/1980 | Haben et al. | 179/18 E |
| 4,232,199 | 11/1980 | Boatwright et al. | 179/18 B |
| 4,256,928 | 3/1981 | Lesea et al. | 179/18 BE |
| 4,278,844 | 7/1981 | Jones | 179/18 B |
| 4,286,118 | 8/1981 | Mehaffey et al. | 179/18 AD |

OTHER PUBLICATIONS

"Electronic Private Automatic Branch Exchange EBX-1000", Göhland, Roosmalen, *Philips Telecom. Rev.*, vol. 33, No. 3, Sep. 1975, pp. 105–111.
"Message Service by Automatic Intercept System", Ishii et al., *Japan Telecommunications Review*, Jan. 1978, pp. 11–16.

*Primary Examiner*—Thomas W. Brown
*Attorney, Agent, or Firm*—Burns, Doane, Swecker & Mathis

[57] ABSTRACT

The central unit of a PABX telephone system includes an associated computer unit that operates to provide visual information to an operator when calls to an extension in the system are to be intercepted. The associated computer unit includes a memory into which a subscriber to the system enters information relating to the reason his calls are to be intercepted, or the like. Any calls to the intercepted extension are routed to the operator, who is simultaneously provided with a visual display of the information stored in the computer memory.

10 Claims, 4 Drawing Figures

INTERCEPT INFORMATION DISPLAY FOR A PRIVATE AUTOMATIC BRANCH EXCHANGE TELEPHONE SYSTEM

This application is a continuation of application Ser. No. 569,655, filed Jan. 10, 1984, which is a continuation of application Ser. No. 185,731, filed Sept. 11, 1980, both of which are now abandoned.

TECHNICAL FIELD

This invention relates to a device for a PABX (private automatic branch exchange) comprising a unit, preferentially of a computer or microprocessor type, which scans the traffic within the PABX and with which a control function can be exercised in the PABX.

The invention relates more especially to a PABX, comprising a number of extensions and a computer unit, which detects and scans the traffic within it, and to a device for call transfer from an extension to an intercept position or operator within the PABX to cause an output, e.g. on a display or the like at the intercept or operator's position, to indicate the call transfer, and any time indications associated therewith, possibly with the intercepted number and the name associated with that number. By way of example of a PABX may be mentioned that of the Swedish Telecommunications Administration designated exchange, delivered under the type A344.

STATE OF THE PRIOR ART

This invention is usable in connection with, inter alia, the Swedish Telecommunications Administration's PABX type A 344. The integration of an interception facility or interception function permitting any extension of the PABX to have call transfer to another extension, an operator, an intercept position or the like is already known in PABX's of this kind.

In stored-program-controlled automatic telephone exchanges too, for example, the integration of the interception functions with other functions related to the exchange is already known. Also in telephone exchanges having no processor unit the practice is known of arranging an interception function, more or less manually and with operator assistance, through which an extension can inform an operator that he wishes to be intercepted and the reason therefor. A person calling this number can then ask the operator for the information given by the intercepted extension.

DESCRIPTION OF THE INVENTION

Technical Problem

In conjunction with equipment of this kind it is desired that the interception function in the PABX can be simply and effectively performed and that a comparatively large quantity of information can be associated and stored with the interception function as such.

The principles for the interception function known hitherto in PABX's, however, involve limitations in its use and a heavy burden for those who are to handle and administer the information concerned.

Another desire is to have a highly automated and effectively functioning interception function which is also economically feasible in PABX's of this kind.

The Solution

This invention provides an arrangement by means of which a large quantity of information relating to a PABX extension is stored and caused to interwork with the other functions of the PABX. For this purpose there is a computer equipment for interworking or communication with the unit in question which controls, inter alia, the switching function and its equipment of the PABX. The unit also controls the computer in dependence on calls made to the extensions concerned, so that the information stored in the computer concerning the information at the terminal. The computer may constitute an integrated part of the unit, so forming a central processing unit in a stored-program-controlled PABX, or be separated from said unit.

The specific features of this solution of the problem are thus that a computer is associated with or forms part of the unit for interworking with it directly or via a data transmission system, and that a computer terminal, at an operator's or intercept position or the like, is arranged to display, e.g. on a visual display, information concerning interception from any extension, and raising the extension himself enters the information by making a call (raising of the handset and dialling a predetermined code). After said call and code transmission said unit detects and stores the extension's number and the transmitted code. On a later call to said extension the unit is arranged to cause a switching and a call transfer in the PABX controlled by the computer equipment, so that the caller is transferred to an operator or the equivalent and the computer transmits to a terminal a standard information statement (AT LUNCH, GONE HOME, NOT TO BE DISTURBED, etc.) preprogrammed in it, together with the intercepted extension's number. In further developments of the idea of the invention are suggested more detailed uses of the switching and signaling arrangements.

The invention also includes the possibility that predetermined first extensions are groupwise allotted to different predetermined intercept positions or sites, and the PABX is so devised that an extension can himself arrange for call transfer to the intercept position or site allotted to him. The PABX is devised to transfer to that intercept position or site a call to the extension when the intercept position or site is attended and in an unengaged state, and the PABX and intercept position or site are devised, in the unattended or engaged state of the intercept position or site, to transfer the call to the operator. Predetermined second extensions are not allotted any specific one of the predetermined intercept positions or sites. The PABX is devised to permit self-interception from the second extensions, and interception of the second extensions from each of said intercept positions or sites. In the case of a self-intercepted second extension, the PABX is devised to transfer calls to the operator and, in the case of interception of the second extension from one of said intercept positions or sites, to transfer calls to that position.

In further developments of the invention is described, inter alia, how self-interception from an extension can be effected with a code, which can be varied in dependence on the desired content, which shall accompany the interception. By dividing the code into two parts, the first part being used for selection of the interception facility as such and of various reasons, programmed in the PABX, for its use on any occasion (such as holiday, meeting, lunch, etc.) while the second part of the code determines the time indications (hour-minute, month-day) for the interception, an interception function is obtained which provides an information content relating thereto that is comparatively large although a special interception computer is unnecessary.

In its most general embodiment, however, the invention is applicable also in PABX equipment which contains or interworks with a special interception computer arranged to store large quantities of information relating to the interception function.

The further developments also contain indications for location in the PABX of the components concerned.

Advantages

Through what has been proposed, a PABX extension can himself so arrange for interception that the unit or person (operator, intercept position, etc.) supervising the interception function can receive information not only that the extension is on interception, but also about the reason, e.g. that the party concerned has gone home, is ill, may not be disturbed, etc.

Through what has been proposed, an interception function is obtained which in a technically simple and economical way can be integrated with a PABX and provide a large information content in conjunction with the interception as such.

Even if the new device in itself provides for interworking of the PABX with a special interception computer, it is also possible with the new device to exercise the interception function without such a computer. In spite of this feature, the information content relating to the interception function in this latter case can still be comparatively large.

In the further developments it is possible for an extension, using information of his own choice combined with permanently programmed information in the PABX, to generate the interception function, inter alia, from his own station.

BRIEF DESCRIPTION OF THE ACCOMPANYING DRAWINGS

An embodiment, as described at present, of a device exhibiting the characteristics of the invention will now be described with reference to the accompanying drawings, of which FIG. 1 shows schematically parts of a PABX utilizing the device, FIG. 2 shows schematically the device in conjunction with a data transmission system, FIG. 3 shows schematically in greater detail how, in particular, the interception function is arranged in a type of PABX as in FIG. 1, and FIG. 4 shows in the form of a block diagram a PABX equipped with the new device.

DESCRIPTION OF THE PREFERRED EMBODIMENT

Figure 1:
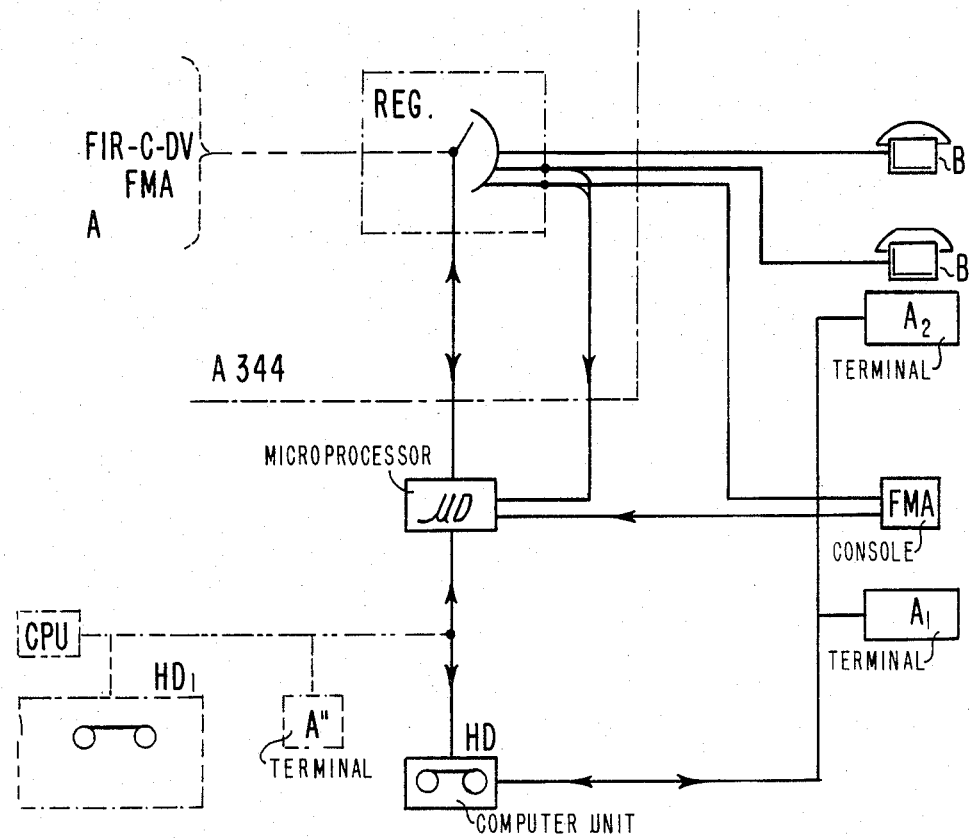

In FIG. 1 the illustrated PABX is symbolized by a register REG and called extensions B. The PABX is equipped with a unit, $\mu D$, e.g. a known microprocessor type, which scans the telephone traffic occurring in the PABX. It scans both the internal and the external traffic. The unit is arranged, likewise in a known manner, to exercise a control function, e.g. to bring about switching operations.

The PABX incorporates an interception facility, i.e. a facility by means of which calls to an intercepted extension are transferred to an intercept position or to an operator with a console FMA, from whom the caller is informed that the B-extension is inaccessible.

In accordance with the idea of the invention a computer equipment, HD, separated from the PABX or integrated in it, will be used as a data acquisition means for the interception facility. The computer equipment has one or more terminals A1, A2, the terminal A1 in the figure forming part of the operator's equipment and the other terminal A2 being used at the intercept position.

By means of said terminals, information relating to the interception service can be entered in the computer equipment HD. The information may be to the effect that the B-extension or extensions concerned are inaccessible or are accessible only under certain circumstances. In the latter case the information may be extended to include, for example, time of return, name of B-extension, etc. The computer equipment and terminals are so arranged that the information entered in the computer can be displayed on the terminals A1 and/or A2 of the person in charge of the interception facility or intercept position.

The computer equipment HD is connected to the unit $\mu D$ which, in addition to detecting the traffic in the PABX, also detects the information entered in HD for the B-extensions connected at any time to the interception facility. When, therefore, call arrives at a B-extension who has notified the intercept position or the operator that he is inaccessible, and possibly other data, and this information has been entered in the computer from the operator's or other supervisor's terminal, the unit $\mu D$ reacts through its communication with HD and transfers the call to the intercept position or the operator by operating the devices concerned in the PABX in the known manner. The intercept position or operator receives automatically from the computer equipment the data entered in it for the extension, which data are displayed in suitable form, e.g. on a visual display. In this way the interception service is greatly facilitated for the operator or other supervisor.

If the operator is called by an external subscriber, who asks for an extension, the latter can be called from the operator's console FMA via the unit $\mu D$, after which the operator is informed of the state of the extension on her terminal.

In the aforementioned example communication between the unit $\mu D$ and the computer equipment was direct. According to the invention, however, communication between the two can take place via a data transmission system, comprising a central processing unit CPU which provides several services, each of which is allotted its additional computer equipment HD. In the figure the bus connection of the data transmission system is marked BUS. Each of the computer equipments HD can have its own terminal A" for administration of the information in it. Two or more computer equipments can be controllable from a common terminal, etc.

Figure 2:
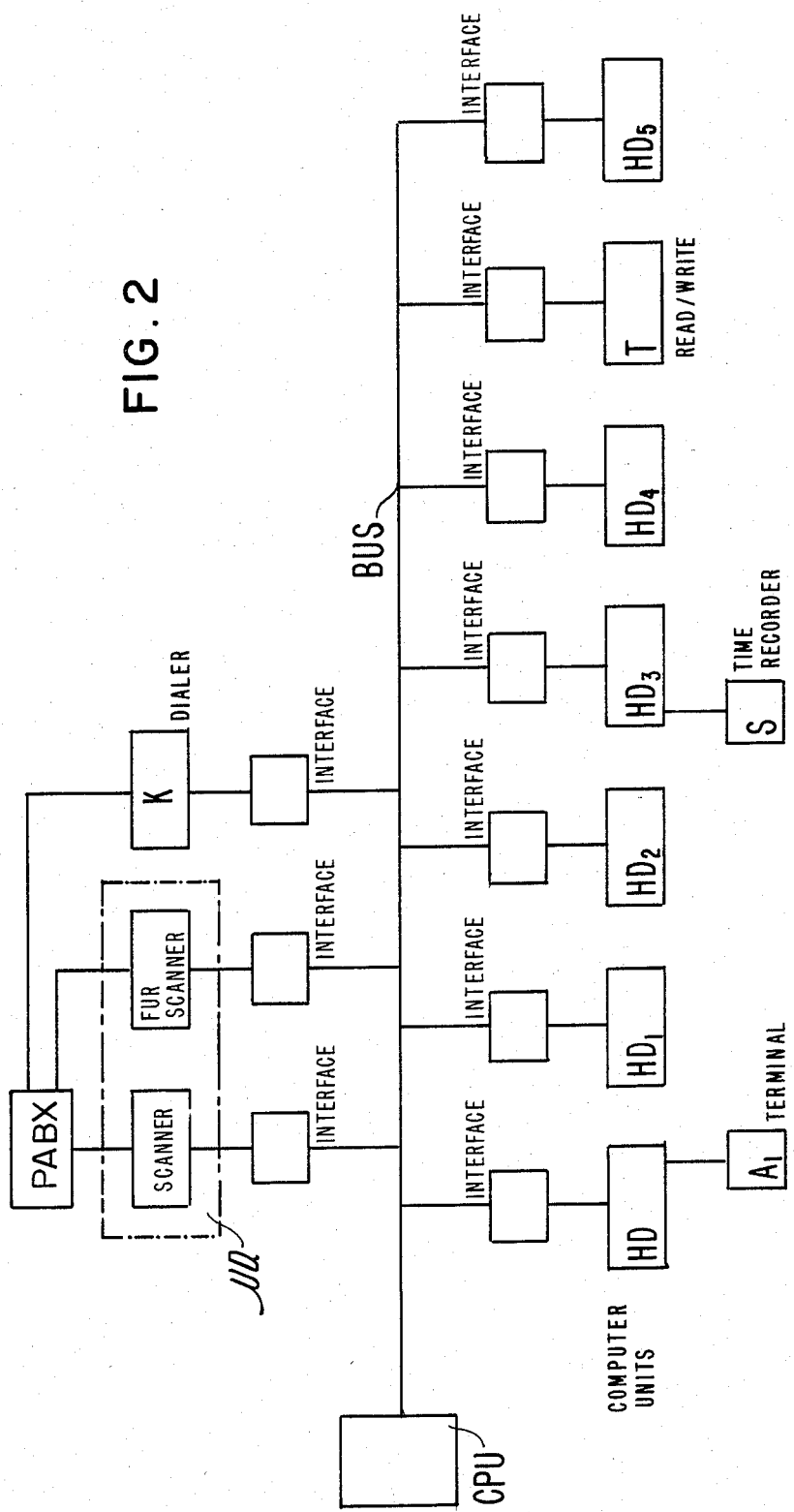

FIG. 2 shows the case when the unit $\mu D$ and the computer equipment HD communicates with one another in both directions via a central processing unit CPU in a data transmission system.

The central processing unit can in such case be programmed to add further information to that entered in the computer equipment HD, for example, if a flexible working hours function has been integrated in the PABX, in connection with call transfer a caller can be informed when the called party clocked out. To the computer equipment HD3, therefore, are connected a number of time recorders S or the like, which provide individual information to HD3 and this individual information can be transferred by CPU to terminal A1 of the computer equipment HD so that the time indication is displayed on that terminal.

In FIG. 2 the equipments HD1–HD5 are shown, HD1 being used for individual metering, HD2 for directory functions, HD3 for flexible working hours functions, HD4 for programmable number groups, and HD5 for trunk barring functions. The unit T is a write and read unit with teletypewriters, visual displays, etc., and information can be transferred by CPU between any of the computer equipments shown. The square K indicates an abbreviated dialling function.

Figure 3:
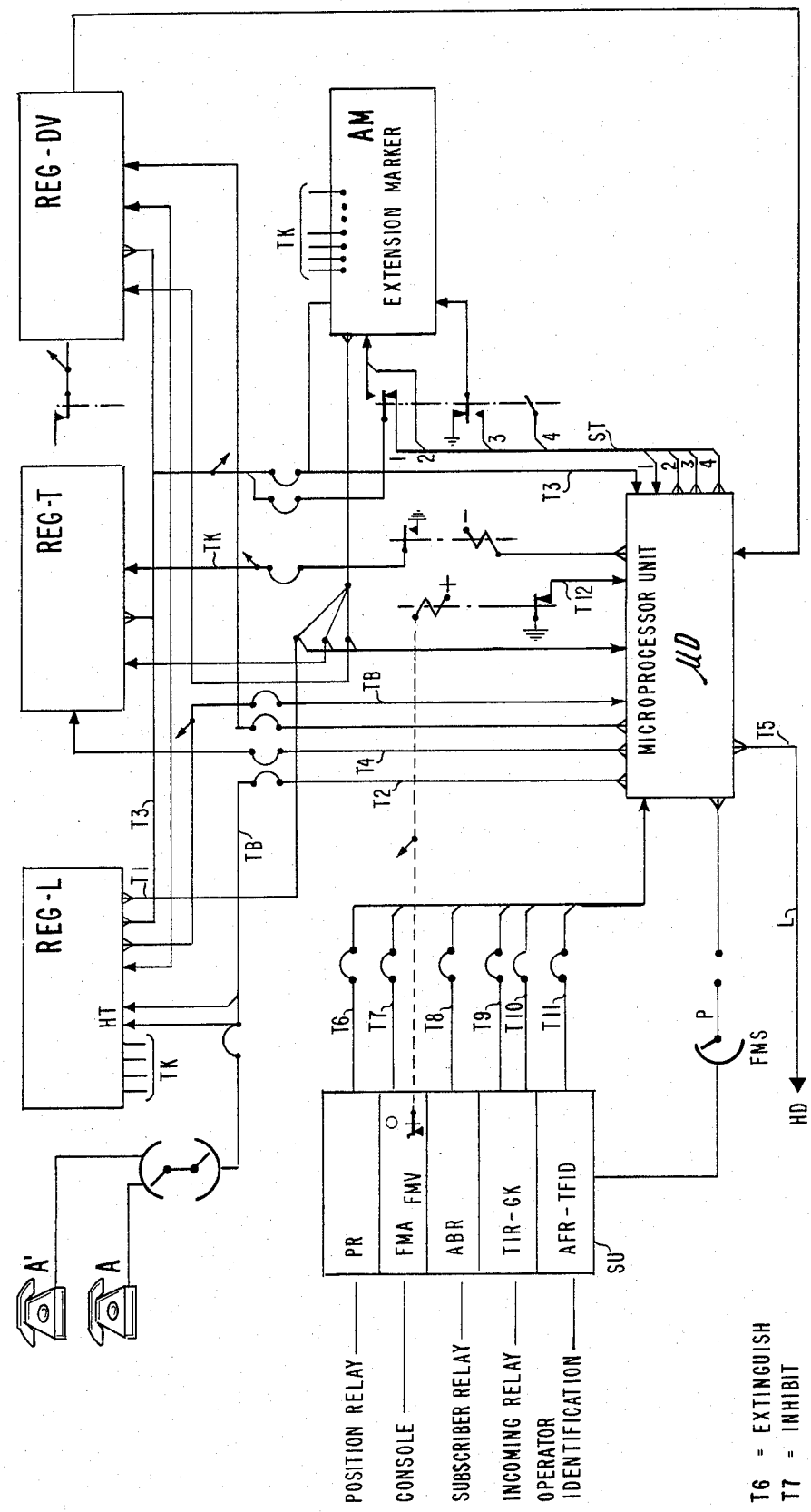

In accordance with the idea of the invention each extension shall be able to set up so-called self-interception. In FIG. 3 one such extension is marked A. This extension can set up self-interception by first lifting his handset, (pressing the call button, etc.) and then initiating (dialling) a code in the form of a series of digits and/or characters. He thereafter replaces his handset, whereupon the self-interception has been executed. The extension can check whether this has been done by again lifting his handset and listening to a confirmation from the PABX, e.g. in the form of a modified dial tone (intermittent tone). The code consists of as many digits as in the normal numbering scheme of the PABX, i.e. if the latter consists of two, four, etc., digits, the code has the same number of digits.

On receipt of the call a register REG-L (L=local) registers the extension's number and transmits it on wire "$t_3$" to which the unit $\mu D$ is connected. The unit stores the extension's number (e.g. 4-digit) and, via control circuits St, controls an extension marker AM which, too, identifies the extension's number and, inter alia, its category (external calls barred/not barred, etc.).

The code dialled by the extension A is received and stored in the unit $\mu D$. The first digit of the code indicates that the interception service is desired. The code is divided into a number of subcodes, e.g. 8001, 8002, 8003 ... 8008, each of which relates to a standard message preprogrammed in the computer equipment HD, e.g. GONE HOME, AT LUNCH, DO NOT DISTURB, etc. The preprogramming can be done on the operator's console FMA or in conjunction with manufacture, etc.

When the unit has received and stored the information that the extension user wishes his calls to be intercepted, and the reason, it erases via a wire "$t_k$" the code dialled into REG-L.

On a call to the thus intercepted extension the caller, e.g. extension A', is automatically transferred or connected to an operator who at the same time, in accordance with the foregoing, is informed on her visual display or the like that the called extension is intercepted and the reason therefor. This is done as follows. When the extension A who in the example is another extension of the PABX, raises his handset, his number is indicated in REG-L which, as above, is detected by the unit $\mu D$ and the extension marker AM. The unit stores the number. When the extension A' dials a self-intercepted extension's number, this is registered in REG-L and detected and stored in the unit, which discovers that the extension is intercepted. REG-L has, on a wire "$t_B$", notified the unit that it is an incoming call. Via wire "$t_K$" the dialled number of REG-L is erased and the number of the operator's line is transmitted to REG-L from the unit on wire "$t_2$" so that the call is automatically transferred to the operator concerned (see also FIG. 1). The unit at the same time controls the computer equipment HD on wire "$t_5$" so that HD extends its preprogrammed information to the relevant terminal ($A_1$ in FIG. 1).

The operator can then notify the caller that the self-intercepted extension is inaccessible and the reason why.

An incoming external call is registered in REG-DV (DV=direct dialling in) and transferred in the same way to an operator.

In FIG. 3 is shown also a set of racks SU with a position relay set PR, console FMA (see also FIG. 1), subscriber relay set ABR for an extension equipped with terminal (intercept position), through-connectable operator's line TIR-Gk (IR=incoming relays), call distribution for operator identification AFR-TFID. P symbolizes preselection circuits for connection to operators.

A wire "$t_6$" for extinguishing the visual display via unit $\mu D$ and HD after use, is connected to the PR relay set, "$t_7$" is an inhibition wire (see below) and "$t_8$" is used for busying of ABR. TIR-Gk as well has a busying wire "$t_9$" and also a blocking wire "$t_{10}$". AFR-TFID has a scanning wire "$t_{11}$" (identification).

The aforementioned arrangement also incorporates devices N for the night-switching function of the PABX. These devices are controlled from FMA and when, at the end of the day for example, the operator withdraws her headset or the like, a switch 0 (FMA/FMV) is actuated which in turn actuates the said devices N. Via "$t_{12}$" these devices control the unit $\mu D$, so that interceptions valid for the day are erased and do not remain on the following day. The devices N can be replaced by a built-in clock or other control device.

A self-intercepted extension, who receives an interrupted tone HT via "$t_2$" in the interception state, can himself cancel the interception by making a call as related above and dialling a specific code, which may be a subcode to the basic code (8000) for the interception facility. The cancellation code may be, for example, 8009. By renewed lifting of the handset and listening to hear whether the dial tone is normal (not interrupted) the extension can check that the cancellation has been executed. When the unit detects the cancellation code dialled by the extension into REG-L, it erases in its memory the information that the extension is intercepted. It is also possible to have the cancellation performed by the operator, in which case, on command from the terminal, the operator's equipment obtains access to the unit $\mu D$ and the latter erases the interception.

On a call from the operator to a self-intercepted extension the unit breaks the connection to the extension at the same time the information selected by the extension when setting up self-interception appears on the operator's display with the intercepted extension's number. For certain types of information, however, e.g. NOT TO BE DISTURBED, ENGAGED, etc., it can be arranged that the operator can initiate a special inhibition signal on wire "$t_7$", which prevents breaking of the connection between operator and extension, so that, despite the interception, the operator can get through to him and announce that there is a call for him.

Figure 4:
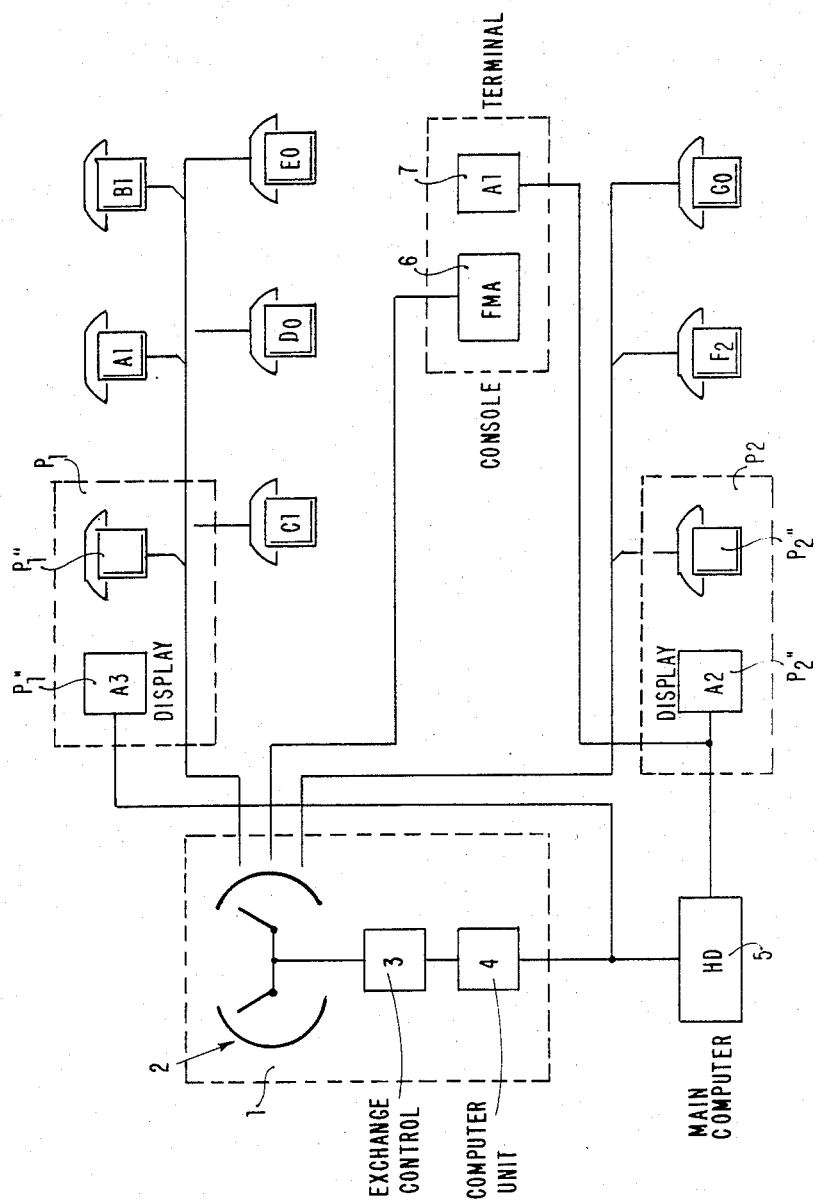

In FIG. 4 a PABX is symbolized by 1. It may be of a known type, by way of example A344 of the Swedish Telecommunications Administration. The parts of the PABX shown in the figure are switching equipment 2, exchange control device 3, and a computer unit 4, which scans and controls traffic in the PABX. The computer unit may consist of a known type of microcomputer and, since the PABX with associated computer unit are already well known, it will not be further described in this context. The PABX extensions are connected to the switching equipment by extension lines in the known manner. The extensions are divided into predetermined groups, of which first extensions are allotted to different intercept positions or sites in the PABX and second extensions are not allotted to such positions. Two intercept positions are indicated in the figure by P1 and P2. They consist in principle of conventional extensions sets P1' and P2'. The interception position also has terminal equipment which, as related below, may vary according to whether the PABX is equipped with or connected to a special main computer 5. The PABX also incorporates operator's equipment which in principle consists of a console 6 and a terminal equipment 7 comprising visual display, output device, etc., which can be read by the operator. The intercept position P1 is equipped with a display P1", on which information can be read by the person serving the position. The intercept position P2 has similarly an equipment P2" comprising a display, printer or the like for indication of information relating to the intercepted extensions.

A first group of extensions A1, B1 and C1 is connected to the first intercept position. Another group of first extensions F2 is connected to the second intercept position P2. A second group of extensions, on the other hand, is not allotted to any specific intercept position but can be connected to an optional intercept position or to the operator. This second group of extensions is represented in the figure by extensions DO, EO and GO. The PABX is so arranged that an extension can set up self-interception by dialling a code described below. The PABX is also so arranged that an intercept position supervisor can intercept each of the extensions allotted to that position, i.e. intercept position P1 can intercept extensions A1, B1 and C1 and intercept positon P2 can intercept extension F2. The PABX is so arranged that an incoming call to an intercepted extension is transferred to the intercept position set P1', P2' if the intercept position in question is attended and in an unengaged state. If, on the other hand, the intercept position is unattended or engaged when the call arrives, the call is transferred to the operator's equipment 6, 7. An extension allotted to an intercept position can in principle be intercepted from any intercept position or operator's terminal. An incoming call to an intercepted extension is, however, always connected to the intercept position to which the latter is allotted or, if the intercept position is engaged, to the operator's terminal.

The second extensions, which are not allotted to a specific incept position, can be used to set up self-interception by dialling a special code. In this case an incoming call to a thus intercepted extension will be transferred to the operator's equipment 6, from which information about the intercepted extension can be given. If, on the other hand, an intercept position, which may consist of any of the intercept positions in the PABX, has intercepted an extension DO, EO or GO in the second group of extensions, an incoming call to the thus intercepted extension will be transferred to the intercept position which set up the interception. These transfers in conjunction with intercepted extensions can be made in the known manner and in accordance with conventional techniques.

As related above, interception of the various extensions is done with a code which, depending on the information relating to the interception as such, may consist of two or six digits in the PABX numbering scheme. The code, which is varied according to the content that is to accompany the interception, may be considered to be made up of a first portion comprising two digits and a second portion comprising four digits, together forming a six-digit code. In conjunction with interception of an extension it is desirable to be able to indicate the reason for the interception, e.g. that the person has "gone home", or "is at lunch", "is at a meeting", etc. According to the present embodiment the interception facility in the PABX is dialled with the first digit in the first portion of the code, the second digit being used to indicate the reason for the interception. A selection can be made between a number of reasons preprogrammed in the equipment. With the two first digits in the second portion of the code are indicated either the hour of the day (in the case of brief absence) or the month (in the case of lengthy absence). The last two digits in the second portion of the code are used to indicate the minute (in the case of brief absence) or the day of the month (in the case of lengthy absence). In a message of type "gone to lunch" it may also be desirable to indicate the time when the message was given or the time when the interception took place.

The table below shows, inter alia, the pattern of behaviour of extensions in the interception system.

In the table the prefix is the call digit for extensions-executed interception or "follow me". The second digit indicates the type of message to be presented on the operator's interception display for answering redirected calls, the extension himself deciding the content of the message.

| | Digit | | | | | Number | |
|---|---|---|---|---|---|---|---|
| 1 | 2 | 3 | 4 | 5 | 6 | of digits | Remarks |
| Prefix | 0 | | | | | 2 | Cancellation |
| " | 1 | — | | | | 2 | Daily interception without time indication |
| " | 2 | — | | — | | 2 | Daily interception without time indication |
| " | 3 | hour indication | | minute indication | | 6 | Daily interception with time indication |
| " | 4 | hour indication | | minute indication | | 6 | Daily interception with time indication |
| " | 5 | hour indication | | minute indication | | 6 | Daily interception with time indication |
| " | 6 | month indication | | day indication | | 6 | Lengthy absence with time of return |
| " | 7 | month indication | | day indication | | 6 | Lengthy absence with time of return |
| " | 8 | month indication | | day indication | | 6 | Lengthy absence with time of return |
| " | 9 | extension number | | | | 6 | "Follow me" |

With the code above the extension can thus decide what message is to be shown on the display or the like at the intercept or operator's position, comprising for example the reason for interception, time of return with indication of hour-minute or month-day.

As regards the reason for interception, there are many variants such as business journey, holiday, gone to lunch, temprarily out, etc. which are preprogrammed in the equipment in the known manner.

The extensions' calls are detected by the microcomputer 4, as also any extension user wishing interception, as shown by the first digit in the dialled number. When the computer unit 4 identifies the caller, the intercepting extension's number can be established and, if desired, linked to a name in a name register accessible to said computer unit 4 and/or to the time of interception. The digits in the second part of the code can be used for indication of time of return.

In this way a message string is built up comprising extension number, name (if desired), reason for interception, and possibly time of return. The message string is shown in display P1'', P2'' and 7 at the intercept or operator's position.

The advantage of this procedure is that the message is obtained on a display directly connected to the computer unit 4, i.e. an interception computer 5 need not be used for the interception. This latter case is shown in FIG. 4 where the display P1'' at intercept position P1 is connected directly after to the computer unit 4.

In accordance with the foregoing, however, the device can also function if the PABX is connected to an interception computer 5. This latter case is illustrated by the fact that the indication devices P2'' and 7 at intercept position 2 and the operator's equipment are connected to the output of such an interception computer 5. In this case the indication devices P2'' and 7 can be more sophisticated than the comparatively simpler display P1''.

It should be mentioned that a detailed description of all the different device and their cooperation with each other in each and every possible desired state of interception should make the description very extensive and by purpose of explaining only the novel features of the present invention it has been possible to limit the description especially as the used devices are of already known design. Thus, REG and A extension are included in the exchange A344, A1 and A2 are data terminals including a display, FMA is a operators console includes in A344, $\mu$D is a microcomputer INTEL 8085 together with associated IN- and OUTPORTS for interfacing A344 and the computer HD, CPU is a microcomputer INTEL 8085 together with associated IN- and OUTPORTS and HD is a conventional minicomputer as PDP 11.

In FIG. 2 S is a time indicating device and K is an option included in A 344.

In FIG. 3 are REG-L, REG-T, REG-DV and AM devices included in A344. A3 is a terminal controlled directly from the computer 4.

The invention is not restricted to the embodiment shown by way of example above, but can be modified within the scope of the subsequent claims.

INDUSTRIAL UTILIZATION

The equipment proposed in conjunction with the invention is simple to integrate in the PABX concerned at the time of its manufacture in a factory or the like and in already installed PABX.

We claim:

1. In a private automatic branch exchange telephone system having a plurality of telephone extensions connected to a central switching means and at least one operator's console connected to said central switching means, wherein said central switching means includes a first control unit for detecting and controlling communication traffic within the telephone system, a method for utilizing a second control unit and at least one terminal having a visual display unit connected to said second control unit and located in the vicinity of said operator's console to enable an operator to respond to an incoming call that is intended for an extension user who is away from that user's extension, comprising the steps of:

storing within memory means a plurality of predetermined messages that respectively related to reasons for the interception of incoming calls;

entering a predetermined code from one of said extensions or from said terminal, said code activating a call intercept function for one of said extensions and designating one of said stored messages;

storing within said first control unit the identification of said one extension when said code is entered;

detecting within said first control unit that an incoming call is intended for said one extension and automatically transferring the call to said operator's console rather than enabling the call to be put through to said one extension;

simultaneously with the transfer of said call, providing an indication from said first control unit to said second control unit of the identification of said extension; and reading said designated message from said memory means in response to receipt of the identification of said extension at said second control unit and displaying said message on said visual display unit to enable the operator to simultaneously answer the intercepted call and orally inform the calling party of the information displayed on the visual display unit.

2. The method of claim 1 further including the step of entering information supplemental to the designated message into said memory means along with the entering of said code, and displaying the information with the message on said display unit.

3. The method of claim 1 wherein said code comprises a number of digits equal to the number of digits in an access code for the system.

4. The method of claim 1 wherein the telephone system includes a night switching function, and further including the steps of detecting actuation of said function and automatically disabling the interception and transfer of calls to said operator's console in response to such detection.

5. The method of claim 1 further including the step of generating a modified dial tone to indicate that the extension is having its calls intercepted.

6. The method of claim 1 wherein the telephone system includes an intercept station with a display terminal as well as an operator's station, with one or more of the telephone extensions being associated with said intercept station, and further including the steps of transferring incoming calls for the associated telephone extensions and preprogrammed messages to said intercept station when said intercept station is in an enabled state, and transferring said calls and messages to the operator's station when the intercept station is in a disabled state.

7. The method of claim 1 wherein said entered code includes time related information that is displayed along with the designated one of said stored messages.

8. The method of claim 1 further including the step of dialing a second predetermined code from said one extension to cancel the call intercept function.

9. The method of claim 1 wherein said memory means and said second control unit are included in a computer unit that is separate from said first control unit.

10. The method of claim 1 wherein said first control unit and said second control unit are embodied in a single computer.

* * * * *